(12) United States Patent
Thomas

(10) Patent No.: US 6,240,772 B1
(45) Date of Patent: Jun. 5, 2001

(54) SYSTEM AND METHOD FOR DETECTING ENGINE MALFUNCTION BASED ON CRANKCASE PRESSURE

(75) Inventor: Eric D. Thomas, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/207,931

(22) Filed: Dec. 9, 1998

(51) Int. Cl.[7] .............................. G01L 3/26; G01L 5/13; G01M 15/00
(52) U.S. Cl. .............................................. 73/117.3
(58) Field of Search .................... 73/117.3, 116; 123/478

(56) References Cited

U.S. PATENT DOCUMENTS

| | | |
|---|---|---|
| 4,223,654 | 9/1980 | Wessel et al. . |
| 4,424,709 * | 1/1984 | Meier, Jr. et al. .................. 73/117.3 |
| 5,131,371 | 7/1992 | Wahl et al. . |
| 5,165,373 | 11/1992 | Cheng . |
| 5,165,579 | 11/1992 | Lund . |
| 5,231,962 | 8/1993 | Osuka et al. . |
| 5,284,118 * | 2/1994 | Kato et al. ........................... 123/478 |
| 5,313,924 | 5/1994 | Regueiro . |
| 5,357,926 | 10/1994 | Hu . |
| 5,402,760 | 4/1995 | Takeuchi et al. . |
| 5,426,587 * | 6/1995 | Imai et al. ........................... 73/117.3 |
| 5,445,128 | 8/1995 | Letang et al. . |
| 5,477,827 | 12/1995 | Weisman, II et al. . |
| 5,483,927 | 1/1996 | Letang et al. . |
| 5,494,219 | 2/1996 | Maley et al. . |
| 5,561,600 * | 10/1996 | McCombie .......................... 73/117.3 |
| 5,647,317 | 7/1997 | Weisman, II et al. . |
| 5,687,694 * | 11/1997 | Kanno ...................................... 73/119 |
| 5,732,676 | 3/1998 | Weisman et al. . |
| 5,771,865 | 6/1998 | Ishida . |

OTHER PUBLICATIONS

U.S. Application No. 08/870,781, Thomas, filed Jul. 20, 1999.

* cited by examiner

*Primary Examiner*—Benjamin R. Fuller
*Assistant Examiner*—Maurice Stevens
(74) *Attorney, Agent, or Firm*—Brooks & Kushman PC

(57) ABSTRACT

A system and method for detecting engine malfunctions based on crankcase pressure include determining a reference value indicative of current engine operating conditions and using the reference value to determine a crankcase pressure limit which varies as a function of the reference value. The sensed crankcase pressure is compared to the limit to determine when a fault condition exists. The reference value is preferably a function of engine speed and requested engine torque and includes a second order term multiplied by a calibratable constant which controls sensitivity of the fault determination. The sensitivity may be adjusted to provide equally detectable faults across all engine speeds and loads, to be more sensitive to faults occurring at higher engine speeds, or to be more sensitive to faults occurring at higher engine loads. The system and method control the engine based on the determination of an engine fault. Subsequent control may include alerting the vehicle operator, reducing available engine torque, stopping the engine and/or logging a fault for subsequent service or maintenance. Early cylinder/piston fault detection provides more time for the vehicle operator and/or the engine controller to take remedial actions to prevent more serious engine damage.

19 Claims, 5 Drawing Sheets

SYSTEM AND METHOD FOR DETECTING ENGINE MALFUNCTION BASED ON CRANKCASE PRESSURE

TECHNICAL FIELD

The present invention relates to a system and method for detecting an engine malfunction in an internal combustion engine using crankcase pressure.

BACKGROUND ART

In the control of internal combustion engines, the conventional practice utilizes electronic control units having volatile and non-volatile memory, input and output driver circuitry, and a processor capable of executing a stored instruction set, to control the various functions of the engine and its associated systems. A particular electronic control unit communicates with numerous sensors, actuators, and other electronic control units necessary to control various functions, which may include various aspects of engine malfunction diagnostics, fuel delivery, transmission control, or many others.

Malfunction diagnosis in internal combustion engines is commonplace. This is due to the desire to detect engine failures or malfunctions before they occur, or as soon as possible after they occur, to provide an opportunity for remedial measures to avert severe engine damage. Crankcase pressure has been used to detect various piston-related engine malfunctions. One method is to use a pressure limit switch which provides a signal when crankcase pressure exceeds a predetermined threshold. This approach requires a pressure limit switch selected based on a particular application or an engine family which exhibits similar crankcase pressures during operation. A crankcase pressure exceeding the predetermined threshold results in the limit switch generating a signal which is used by the electronic control unit to indicate a fault. The electronic control unit may then take appropriate action depending upon the particular application, which may include generating a warning message or indicator light, or shutting down the engine, for example.

Another method of detecting an engine malfunction based on crankcase pressure uses a pressure sensor which provides a continuously variable signal representing current crankcase pressure. The electronic control unit periodically samples the signal generated by the pressure sensor and compares it to a predetermined crankcase pressure limit. The pressure limit is generally a value which is determined based on expected crankcase pressure at the maximum rated engine speed and load (or power). This method allows the use of a single crankcase pressure sensor for a variety of applications since the limit value may be calibrated for each engine or engine family and stored in the electronic control unit. While this strategy is capable of detecting various piston or cylinder-related malfunctions at maximum speed and load, it is insufficient to detect impending failures at lower speeds and loads. In addition, it is desirable to detect failures or impending failures as quickly as possible to provide the electronic control unit or the vehicle operator sufficient time to take remedial actions to avoid a catastrophic failure.

DISCLOSURE OF INVENTION

It is therefore an object of the present invention to provide a method and system for enhanced engine malfunction detection based on engine crankcase pressure.

Another object of the present invention is to provide a system and method for detecting an engine malfunction having a selectable or tunable sensitivity for various applications.

A further object of the present invention is to provide a system and method for detecting piston/cylinder related engine malfunctions at low engine speeds and loads.

Another object of the present invention is to provide a system and method for detecting an engine fault having equal detectability of excessive crankcase pressure at all speeds and loads.

A still further object of the present invention is to provide a system and method for engine protection which function while the engine is operating at less than maximum power.

Yet another object of the present invention is to provide a system and method for engine protection capable of detecting a failed piston condition immediately after the engine is started.

In carrying out the above object and other objects and features of the present invention, a method for detecting engine malfunctions is provided. The method includes sensing crankcase pressure, determining a current value for at least one engine operating parameter and comparing the crankcase pressure to a limit which varies as a function of the at least one engine operating parameter. The method further comprises providing an indication that crankcase pressure has exceeded the crankcase pressure limit and may also include controlling the engine based on the indication. In one embodiment, an indexing value is determined based on the engine operating parameter(s) and used to access a look-up table containing crankcase pressure limit values. Preferably, the index value is a function of engine speed and requested torque. Of course, the at least one engine operating parameter may be any one or more of a variety of engine operating parameters which are measured, sensed, calculated, or inferred, including engine speed, actual or requested torque, oil temperature, oil pressure, fuel temperature, coolant temperature, and the like.

In further carrying out the above objects, and other objects, features, and advantages of the invention, a computer readable storage medium is provided. The computer readable storage medium has information stored thereon representing instructions executable by a computer to enhance engine malfunction detection. The computer readable storage medium includes instructions for determining a crankcase pressure limit based on at least one engine operating parameter. The computer readable storage medium also includes instructions for comparing a sensed crankcase pressure to the determined limit and generating a signal when the sensed crankcase pressure exceeds the limit.

A system for providing enhanced fault detection based on engine crankcase pressure includes a crankcase pressure sensor for providing a continuously variable signal indicative of crankcase pressure in communication with an electronic control unit for controlling an internal combustion engine. The system also includes at least one additional sensor which provides a signal indicative of an engine operating parameter. The electronic control unit includes control logic for determining a value indicative of crankcase pressure based on a signal provided by the crankcase pressure sensor. The electronic control unit also includes control logic for determining a reference value indicative of engine operating conditions based on signals provided by the at least one additional sensor. The electronic control unit uses the reference value to determine a current limit for the crankcase pressure and compares the crankcase pressure value to the limit. If the crankcase pressure value exceeds the limit value, the control logic generates a corresponding fault signal or code. The fault code may be logged for future reference by service personnel and used by the electronic control unit for subsequent processing which may include illumination of a service indicator, reduction of available engine power, and/or shutdown of the engine.

The advantages accruing to the present invention are numerous. For example, the present invention facilitates detection of faults while the engine is operating at less than maximum power. The present invention will redetect a failed piston condition almost immediately after the engine is restarted. The present invention provides a tunable fault detection strategy which can be adjusted or calibrated to change its sensitivity based on the particular application.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
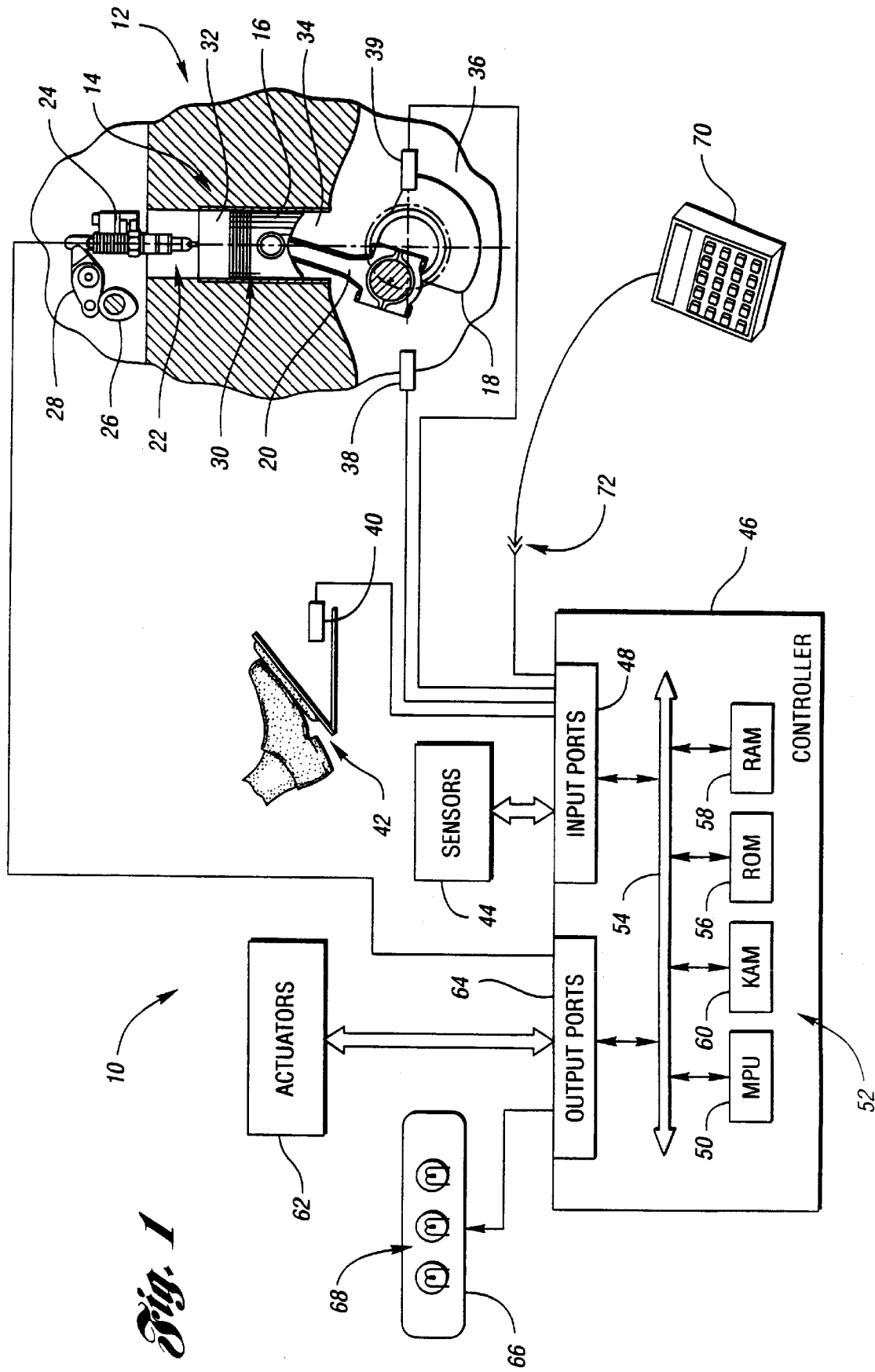
FIG. 1 is a schematic diagram of one embodiment for an engine malfunction detection system based on crankcase pressure according to the present invention.

Referring now to FIG. 1, a system for detecting an engine malfunction based on crankcase pressure according to the present invention is shown. The system, generally indicated by reference numeral 10, includes an engine 12 having a plurality of cylinders with a representative cylinder indicated generally by reference numeral 14. In a preferred embodiment, engine 12 is a multi-cylinder compression-ignition internal combustion engine, such as a four, six, eight, twelve, sixteen or twenty-four cylinder diesel engine, for example. Each cylinder 14 includes a piston 16 operatively associated with a crankshaft 18 via a connecting rod 20 as is well known in the art. An electronic injector 22 having a solenoid 24 is operatively associated with a camshaft 26 via rocker arm 28 for controlling fuel delivery to engine 12. Piston 16 includes piston rings 30 for separating the combustion chamber 32 from the opposite side of the piston/cylinder 34 which is in fluid communication with crankcase 36 in an open crankcase ventilation arrangement.

System 10 preferably includes a crankcase pressure sensor which provides a continuously variable signal indicative of the pressure within crankcase 36. In one embodiment of the present invention, crankcase pressure sensor 38 is a gauge pressure transducer vented to atmosphere with a range of +/− five volts corresponding to a pressure of +/− one psig. System 10 also preferably includes an engine speed sensor 39 which senses rotational speed and/or position of crankshaft 18. System 10 further includes an accelerator/throttle pedal sensor 40 for determining position of accelerator pedal 42 which indicates the desired engine torque requested by the vehicle operator. System 10 may also include various other sensors 44 for generating signals indicative of corresponding operational conditions or parameters of engine 12 or of the vehicle (not shown). Sensors 44 may include appropriate sensors for providing signals indicative of boost pressure, air temperature, oil temperature, oil pressure, oil level, fuel pressure, vehicle speed, and coolant level, in addition to appropriate switches connected to an operator interface to select various optional engine operating modes including a stop engine override, selection and setting of cruise control, and the like. Engine and/or vehicle operating parameters or conditions may also be calculated, determined, or inferred based on one or more of the sensed parameters or operating conditions indicated by sensors 44. For example, requested torque may be inferred or determined based on a signal from accelerator pedal sensor 40. Likewise, engine power may be determined based on engine speed and requested torque. Various other engine operating parameters or reference values may be determined in a similar fashion as will be appreciated by one of ordinary skill in the art.

Sensors 44 are in electrical communication with a controller 46 via input ports and/or conditioning circuitry 48. In a preferred embodiment, controller 46 is the DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety. Controller 46 preferably includes a microprocessor 50 in communication with various computer readable storage media 52 via data and control bus 54. Computer readable storage media 52 may include any of a number of known devices which function as a read-only memory (ROM) 56, random access memory (RAM) 58, keep-alive memory (KAM) 60, and the like. The computer readable storage media may be implemented by any of a number of known physical devices capable of storing data representing instructions executable via a computer such as controller 46. Known devices may include, but are not limited to, PROM, EPROM, EEPROM, flash memory, and the like in addition to magnetic, optical, and combination media capable of temporary or permanent data storage.

Computer readable storage media 52 include data representing program instructions (software), calibrations, operating variables, and the like used in conjunction with associated hardware to effect control of various systems and subsystems of the vehicle, such as engine 12. Controller 46 receives signals from sensors 44 via input ports 48 and generates output signals which may be provided to various actuators 62 and/or components via output ports 64. Signals may also be provided to a display device 66 which may include various indicators such as lights 68 to communicate information relative to system operation to the operator of the vehicle. Of course, alphanumeric, audio, video, or other displays or indicators may be utilized if desired.

With continuing reference to FIG. 1, control logic implemented by controller 46 and associated hardware and/or software determines whether the current crankcase pressure as indicated by pressure sensor 38 has exceeded a limit associated with current engine operating conditions according to the present invention. An engine operating value, reference value, or index value is determined from one or more sensed and/or calculated engine operating parameters including but not limited to engine speed (RPM) and desired engine torque. As will be appreciated by one of ordinary skill in the art, control logic according to the present invention is preferably implemented by a programmed microprocessor operating as described in detail below. However, various alternative hardware and/or software may be used to implement the control logic without departing from the spirit or scope of the present invention.

A data, diagnostics, and programming interface 70 may be selectively connected to controller 46 via a connector 72 to exchange various information between controller 46 and the operator and/or service personnel. Interface 70 may be used to change values within the computer readable storage media 52, such as configuration settings, calibration variables, look-up table values, control logic, pressure thresholds for detecting engine malfunctions, and the like.

In operation, open crankcase ventilation systems such as illustrated in FIG. 1 have a crankcase pressure which varies as a function of engine power. During normal operation, pressure within crankcase 36 will be much lower than pressure within combustion chamber 32. Various cylinder/piston-related faults or malfunctions result in an increased pressure within crankcase 36. While certain mechanical failures will result in a near total loss of compression within combustion chamber 32 and an associated dramatic increase in crankcase pressure, most faults or malfunctions occur more gradually. As such, the present invention provides a system and method for discriminating between increases in crankcase pressure due to normal operational variations and those indicative of an impending or gradual failure condition using a crankcase pressure limit which varies as a function of current engine operating conditions and may be adjusted or tuned to accommodate various applications.

In a preferred embodiment of the present invention, a crankcase pressure malfunction or fault is indicated when the measured crankcase pressure exceeds a corresponding limit value based on current engine operating conditions. Preferably, the limit value is stored in a computer readable storage media within a look-up table indexed by at least one measured and/or calculated engine operating parameter, such as engine speed, engine load (indicated by requested torque, for example), engine power, or the like. Sensitivity to determination of a fault condition may be calibrated or adjusted by a corresponding calibration variable or variables such that sensitivity is increased at higher engine speeds, loads, or approximately equal across all speeds and loads. Accordingly, the increased sensitivity of the present invention provides a system and method for detecting malfunctions over a range of engine loading and engine speeds. Further, the present invention provides early detection and warning of engine malfunction before catastrophic engine failure occurs to facilitate remedial action by the vehicle operator and/or engine controller.

Figure 2:
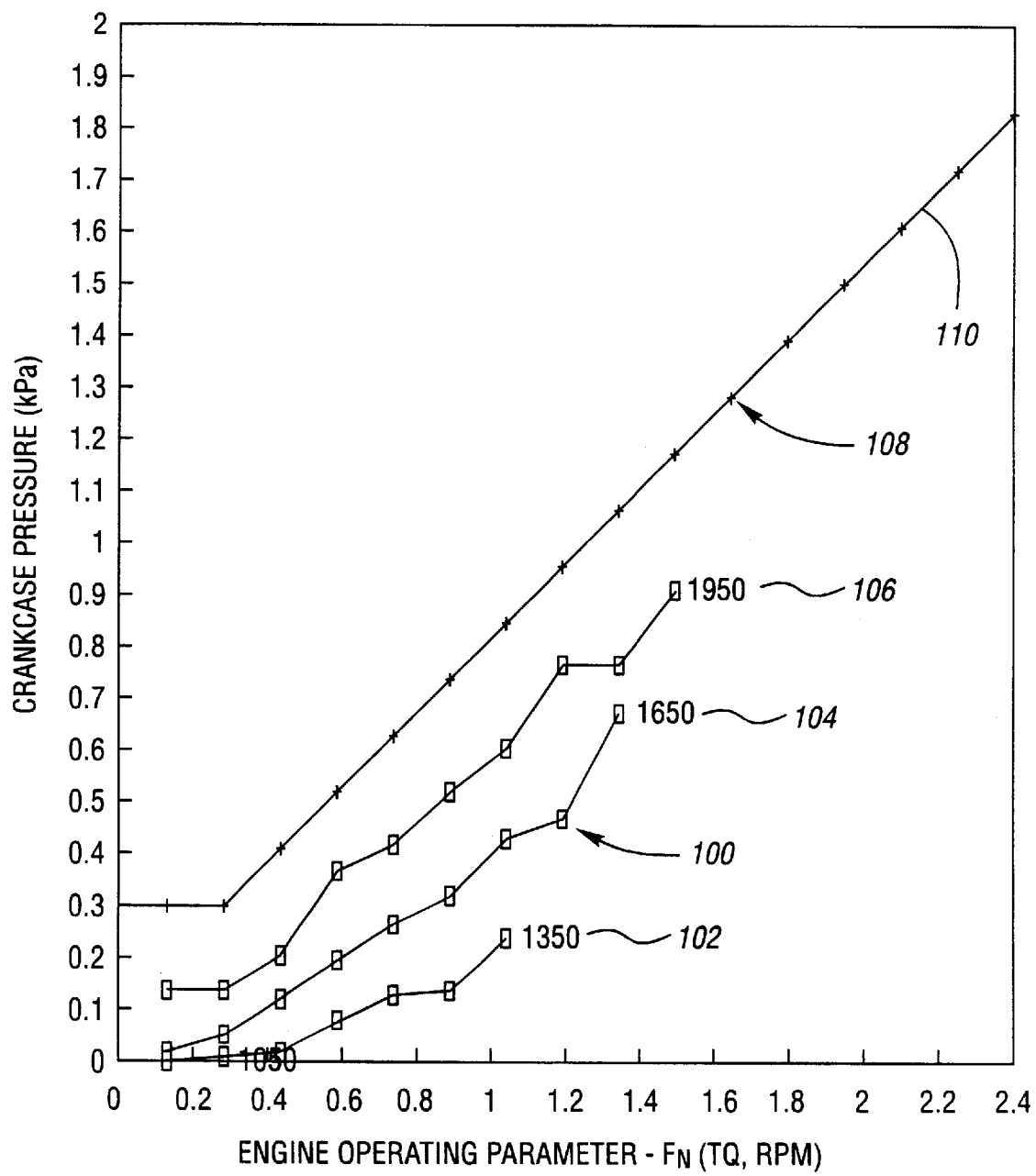
FIG. 2 is a graph depicting normal operating crankcase pressure as a function of an engine operating parameter along with an associated crankcase pressure fault limit having sensitivity adjusted for a smaller tolerance at higher engine speeds.

Referring now to FIG. 2, a graph illustrating calibration and operation of an engine malfunction detection system or method based on crankcase pressure according to the present invention is shown. The graph of FIG. 2 represents actual engine operating data for a six cylinder diesel engine under normal operating conditions. The data 100 represented generally by lines 102, 104, and 106, represent CCP (kiloPascals) as a function of a calculated engine operating parameter based on engine speed and requested torque under "normal" operating conditions, i.e. without a crankcase pressure fault. Data 100 may be used to determine corresponding crankcase pressure limit values 108 represented generally by line 110. The appropriate crankcase pressure limit value (CCPL) is used to determine when a crankcase pressure fault exists for the current engine operating conditions as reflected by the selected engine operating parameter (EOP). Crankcase pressure limit 110 may be established theoretically or empirically using field tests, engine dynamometer tests, warranty data, and the like. Likewise, selection of an appropriate EOP indicative of a particular fault or faults may be selected based on similar testing and may vary based on the particular application and the particular fault.

The crankcase pressure limit values are preferably calibrated sufficiently above the maximum anticipated crankcase pressure values which will be observed under normal operating conditions taking into account engine-to-engine variability. This will increase the confidence in a fault determination while reducing the probability of a false detection. Once the appropriate pressure limit or limits are established, one or more limit values 108 are stored in computer readable storage media 52, preferably in the form of a look up table. As will be appreciated by one of ordinary skill in the art, various intermediate values may be determined by interpolation, extrapolation, or calculation using parameters, values, or constants stored in computer readable storage media 52.

In one embodiment of the present invention, a sensitivity or tuning constant, $K_1$, is used to adjust the sensitivity of the fault determination. The graph of FIG. 2 represents an engine operating parameter based on engine speed and requested torque without a sensitivity adjustment, or equivalently with a $K_1$ of zero. As such, fault detection is more sensitive to pressure variations occurring at higher engine speeds. Curve 102 represents a line or curve of constant engine speed (1350 RPM) as requested torque is varied from 0% (corresponding to engine idle) to 100% (corresponding to 100% throttle). Likewise, curves 104 and 106 represent measured crankcase pressure as a function of a selected engine operating parameter or reference value which is a function of a constant engine speed (1650 RPM and 1950 RPM, respectively) as torque varies from 0% to 100%.

In the embodiment of FIG. 2, the engine operating parameter is represented by:

$$EOP=(N_e{}^*TQ_e+K_1{}^*N_e{}^2)/(K_1{}^*K_2+1)$$

where $N_e$ represents the engine speed in revolutions per minute (RPM), (TQ) is the requested engine torque as indicated by the throttle pedal position sensor, $K_1$ is the sensitivity constant, and $K_2$ is a scaling or normalization factor to scale EOP for various engines. In this example, $K_1$ is zero and $K_2$ represents the RPM limit of 2400. As such, the sensitivity of the crankcase pressure fault detection, i.e. the change in CCP required to trigger a fault condition, is adjusted to be more sensitive to faults occurring at higher engine speeds. This can be seen by the relatively smaller difference between values of the 1950 RPM curve 106 and corresponding limit values as compared with values of the 1650 RPM curve 104 or 1350 RPM curve 102. According to the present invention, the detection sensitivity may be adjusted based on the particular engine configuration and/or application to improve fault detection capability and reliability.

Figure 3:
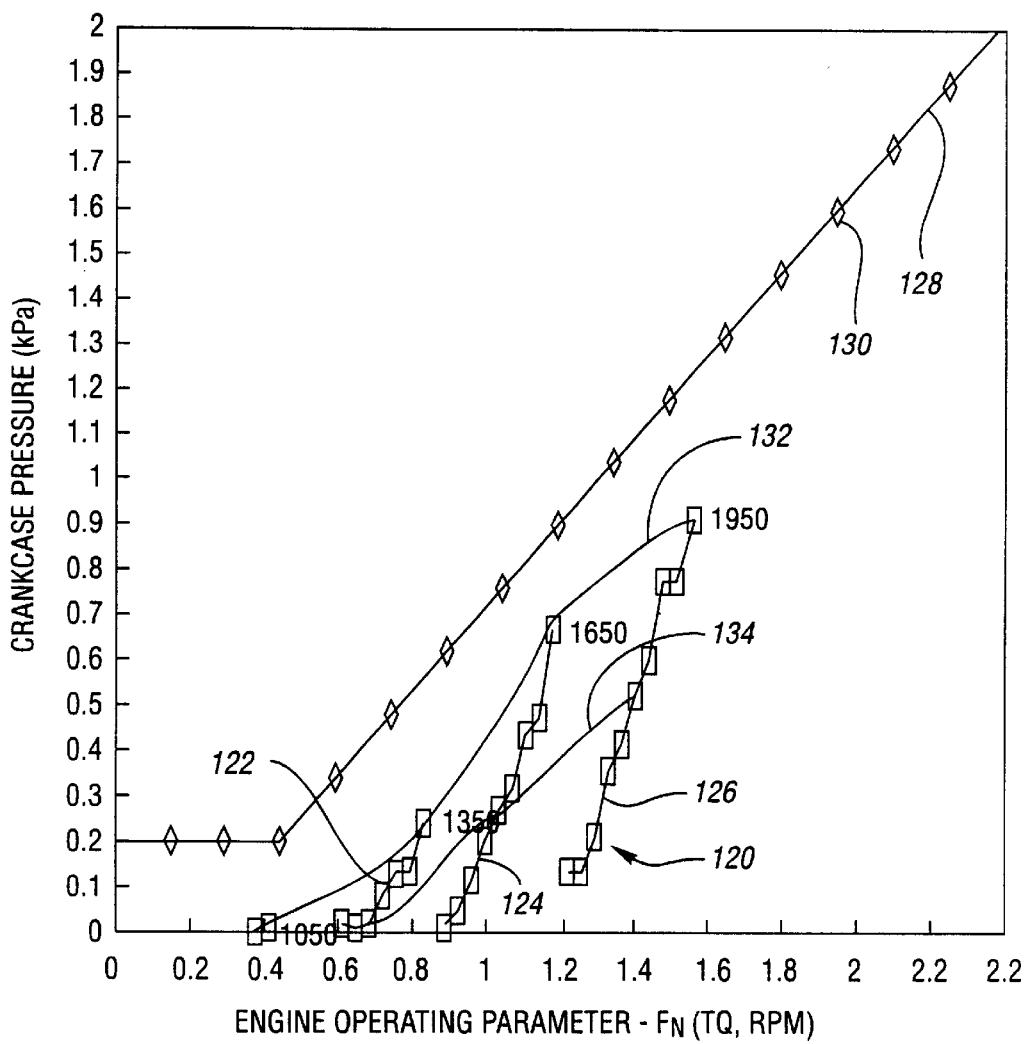
FIG. 3 is a graph depicting normal operating crankcase pressure as a function of an engine operating parameter including a crankcase pressure limit where malfunction detection is more sensitive at higher throttle pedal position or engine load.

FIG. 3 illustrates crankcase pressure data 120 as a function of an engine operating parameter (which is a function of engine speed and requested torque) with a sensitivity or adjustment factor $K_1$ selected to provide increased sensitivity for higher loads or requested torques. In a preferred embodiment, $K_1$ is one-byte calibration constant with a value between 0 (Hex) and FF (Hex) or equivalently 0 and 255 corresponding to scaled values ranging from 0 to 0.001275 represented by $5*10^{-6}$ per bit. FIG. 3 represents a value for $K_1$ of FF (Hex) and 2400 for $K_2$ where the EOP is calculated as described above for FIG. 2. Constant engine speed curves 122, 124, and 126 in addition to crankcase limit curve 128 (with representative values 130) are shown for comparison to FIG. 2. Constant engine load (throttle) curves 132, 134 pass through corresponding points of constant engine speed curves 122, 124, and 126. Thus, curve 132 represents observed "normal" crankcase pressure values as a function of an engine operating parameter for a constant requested torque or throttle pedal position as engine speed varies from idle to 1950 RPM while curve 134 represents pressure values for a relatively lower constant throttle pedal position as engine speed varies from idle to 1950 RPM. As such, a crankcase pressure fault condition, which is indicated when observed crankcase pressure exceeds the corresponding limit value for the current value of the selected engine operating value, is more sensitive to higher engine loads relative to the sensitivity illustrated in FIG. 2.

Figure 4:
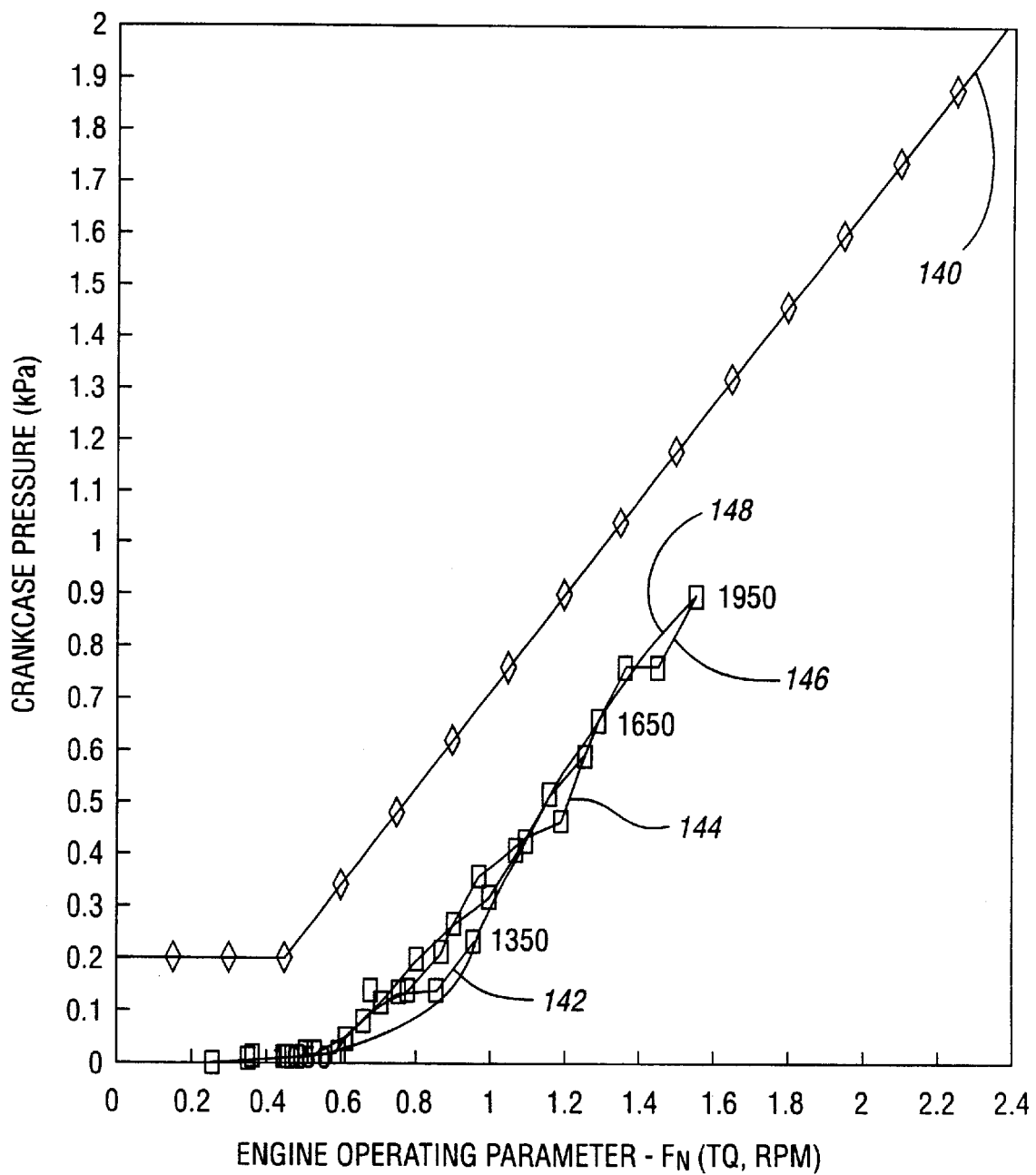
FIG. 4 is a graph depicting normal operating crankcase pressure as a function of an engine operating parameter including a crankcase pressure limit where malfunction detection is substantially equally sensitive across engine speeds and loads.

Referring now to FIG. 4, a graph of crankcase pressure as a function of a selected engine operating parameter is shown with a sensitivity factor calibrated to provide approximately equal sensitivity across all engine speeds and loads. Crankcase pressure limit curve 140 is shown in addition to constant engine speed curves 142, 144, and 146 corresponding to engine speeds of 1350, 1650, and 1950 RPM, respectively, and wide-open throttle curve 148. As illustrated curves 142, 144, 146, and 148 having corresponding values which are approximately equal across the operating range of the engine such that the difference between a value on any one of those curves and the corresponding limit value is about the same. As such, the system will exhibit substantially equal sensitivity to a crankcase pressure fault across all engine speeds and loads. The data illustrated were generated with an EOP calculated as described above with reference to FIGS. 2 and 3 having a value for $K_1$ of 30 (hex) or equivalently 48, and having a value for $K_2$ of 2400.

As illustrated and described with reference to FIGS. 1 through 4, the present invention provides an adjustable engine operating parameter which may be referred to as an index value or reference value, to access or select a corresponding crankcase pressure limit value, preferably stored in a look-up table. This provides for adjustable sensitivity and flexibility in calibrating the crankcase pressure limit while minimizing memory required to store the look-up table. Rather than adjust the indexing variable (EOP), a two-dimensional or three-dimensional look-up table could alternatively be utilized, although clearly not as efficient in terms of memory utilization. Furthermore, a multi-dimensional look-up table requires significantly more development time to calibrate and validate as compared to the preferred method of the present invention which uses a single-dimensional table or array to store the crankcase pressure limit values.

Figure 5:
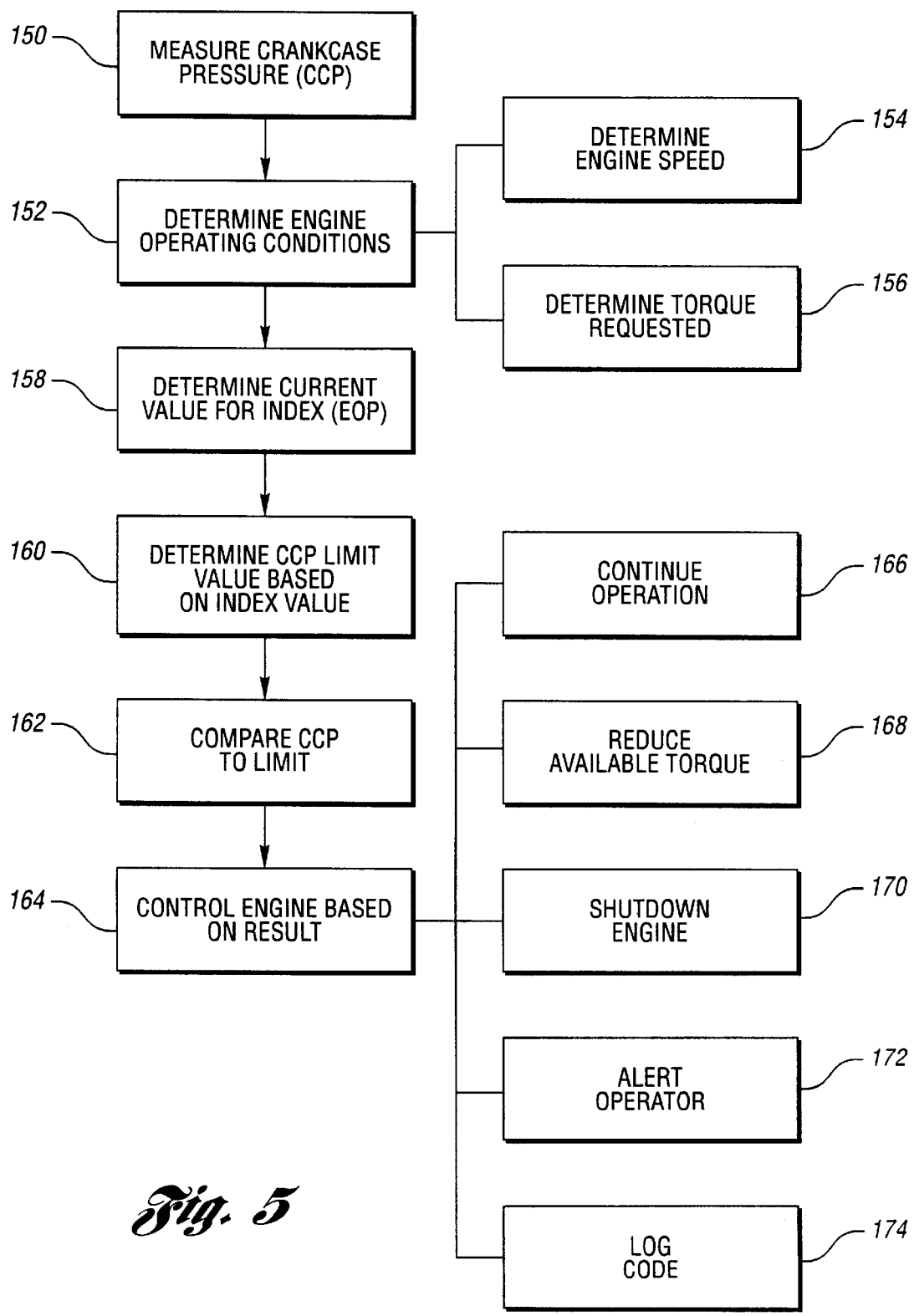
FIG. 5 is a block diagram illustrating operation of a system or method according to the present invention for detecting an engine malfunction based on crankcase pressure.

Referring now to FIG. 5, a flowchart illustrating operation of a system or method for detecting engine malfunctions based on crankcase pressure according to the present invention is shown. As will be appreciated by one of ordinary skill in the art, the flowchart represents control logic which may be implemented or effected in hardware, software, or a combination of hardware and software. The various functions are preferably effected by a programmed microprocessor, such as the DDEC controller, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience only. For example, interrupt or event driven processing is typically employed in real-time control applications, such as control of a vehicle engine or transmission. Likewise, parallel processing, multitasking, or multi-threading systems and methods may be used to accomplish the objects, features, and advantages of the present invention. The present invention is independent of the particular programming language, operating system, processor, or circuitry used to implement the control logic illustrated.

Crankcase pressure (CCP) is measured as represented by block 150. Current engine operating conditions are determined as represented by block 152. This may include determination of the current (instantaneous or average) engine speed as represented by block 154 and/or current requested engine torque as represented by block 156. A current index value is determined based on the current engine operating conditions as represented by block 158. The index value may be calculated using sensed and/or calculated values representing the current engine operating conditions. A crankcase pressure limit value is then determined based on the index value as represented by block 160. Stated differently, the index value defines the domain of the crankcase pressure limit function whose range is determined, preferably via a look-up table and appropriate interpolation and/or extrapolation, as represented by block 160. Of course, the limit value could be calculated based on appropriate constants and operating variables, depending upon the particular application requirements. The current crankcase pressure value is compared to the corresponding limit valve as represented by block 162. The engine is then controlled based on the result of the comparison as represented by block 164. If the current value for CCP is less than or equal to the corresponding limit value, normal operation continues as represented by block 166. If the current value for CCP exceeds the corresponding limit value as determined in block 164, then engine control may include reducing available engine torque as represented by block 168, shutting down the engine as represented by block 170, alerting the operator as represented by block 172 and/or logging a fault condition or code in the engine controller as represented by block 174. This code may then be used by service personnel or fleet operators in diagnosing and correcting the fault condition.

As will be recognized by one of ordinary skill in the art, the control logic illustrated in FIG. 5 is generally repeatedly executed or operated whenever the engine is running. In a programmed microprocessor implementation, the control logic executed to sample the sensor signals in determining the current engine operating conditions and crankcase pressure may be executed in a background or secondary control loop which repeats about every 100 msec, for example.

As such, the present invention provides a system and method for detecting a cylinder/piston fault based on sensed crankcase pressure. The present invention provides an adjustable sensitivity to facilitate early detection of various fault conditions while reducing susceptibility to false indications. System memory is efficiently utilized by adjusting the index variable based on a desired sensitivity, preferably utilizing a second order function of engine requested torque and engine speed. The present invention provides detection sensitivity which can be adjusted to detect fault conditions more quickly at higher engine speeds, higher engine loads, or substantially equally across all engine speeds and loads.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method for detecting an engine malfunction in an internal combustion engine, the method comprising:

sensing crankcase pressure;

determining current engine operating conditions;

determining an index value having an adjustable sensitivity based on the current engine operating conditions;

determining a crankcase pressure limit using the index value;

comparing the crankcase pressure to the crankcase pressure limit; and providing an engine malfunction indication when the crankcase pressure exceeds the limit.

2. The method of claim 1 wherein determining current engine operating conditions comprises determining a current value for engine speed.

3. The method of claim 1 wherein determining current engine operating conditions comprises determining a current value for engine torque.

4. The method of claim 3 wherein determining current value for engine torque comprises determining a current value for requested engine torque.

5. The method of claim 1 wherein determining an index value comprises determining an index value with an increased sensitivity to engine speed.

6. The method of claim 1 wherein determining an index value comprises determining an index value with a greater sensitivity to engine torque.

7. The method of claim 1 wherein determining an index value comprises determining an index value as a function of engine speed and requested engine torque.

8. The method of claim 1 wherein determining an index value comprises determining an index value according to:

$$\text{Index} = (TQ \ast N_e + K_1 \ast N_e^2)/(K_1 \ast K_2 + 1)$$

where TQ represents an engine torque, $N_e$ represents engine rotational speed, $K_1$ represents an adjustable sensitivity constant and $K_2$ represents a scaling constant.

9. A system for detecting an engine malfunction in an internal combustion engine, the system comprising:

a first sensor for providing a continuously variable signal indicative of crankcase pressure;

a second sensor for determining current engine operating conditions;

a microprocessor in communication with the first and second sensors for determining a current crankcase pressure limit based on an index value having an adjustable sensitivity to engine operating conditions, comparing the limit to a current crankcase pressure as indicated by the first sensor, and controlling the engine based on a result of the step of comparing.

10. The system of claim 9 wherein the microprocessor controls the engine by reducing available engine torque when the current crankcase pressure exceeds the limit.

11. The system of claim 9 wherein the microprocessor controls the engine by stopping the engine when the current crankcase pressure exceeds the limit.

12. The system of claim 9 further comprising:

a computer readable storage medium in communication with the microprocessor and having data stored therein representing crankcase pressure limits accessed using the index value.

13. The system of claim 9 further comprising:

a computer readable storage medium having data representing crankcase pressure limits accessed using the index value which varies in response to engine speed and requested engine torque.

14. A computer readable storage medium having information stored thereon representing instructions executable by an engine controller in communication with a pressure transducer for detecting crankcase pressure and a sensor for detecting engine operating conditions to determine an engine malfunction based on the crankcase pressure, the computer readable storage medium comprising:

instructions for sensing crankcase pressure;

instructions for determining current engine operating conditions;

instructions for determining an index value having an adjustable sensitivity based on the current engine operating conditions;

instructions for determining a crankcase pressure limit using the index value;

instructions for comparing crankcase pressure to the crankcase pressure limit; and instructions for providing an engine malfunction indication when the crankcase pressure exceeds the crankcase pressure limit.

15. The computer readable storage medium of claim 14 wherein the instructions for determining current engine operating conditions include instructions for determining engine speed.

16. The computer readable storage medium of claim 14 wherein the instructions for determining current engine operating conditions include instructions for determining requested engine torque.

17. The computer readable storage medium of claim 14 wherein the instructions for comparing crankcase pressure include instructions for accessing a stored crankcase pressure limit based on the index value.

18. The computer readable storage medium of claim 14 wherein the instructions for determining an index value include instructions for determining an index value which is a function of fraction of engine torque and engine speed, including a second order term to adjust sensitivity to crankcase pressure variation in determining a crankcase pressure fault.

19. The computer readable storage medium of claim 14 wherein the instructions for providing an engine malfunction indication include instructions for reducing available engine torque.

* * * * *